H. GUYER.
Pipe-Coupling.

No. 196,084.     Patented Oct. 16, 1877.

Witnesses:                        Hugh Guyer
                                  by his atty
                                  Alex. Selkirk
                                      Inventor.

UNITED STATES PATENT OFFICE.

HUGH GUYER, OF ALBANY, ASSIGNOR OF TWO-THIRDS HIS RIGHT TO SAMUEL BAKER, OF SAME PLACE, AND JOHN H. REYNOLDS, OF TROY, N. Y.

IMPROVEMENT IN PIPE-COUPLINGS.

Specification forming part of Letters Patent No. 196,084, dated October 16, 1877; application filed April 13, 1876.

*To all whom it may concern:*

Be it known that I, HUGH GUYER, of the city and county of Albany, State of New York, have invented an Improved Coupling for Connecting Lead and Iron Pipes; and I do hereby declare that the following is a description thereof, reference being had to the accompanying drawings, forming a part of this specification, in which—

Figure 1:
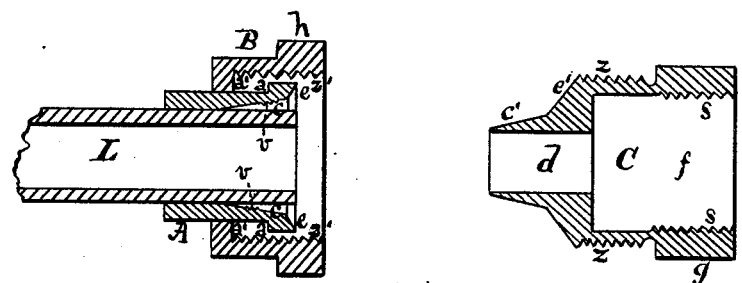
Figure 2:
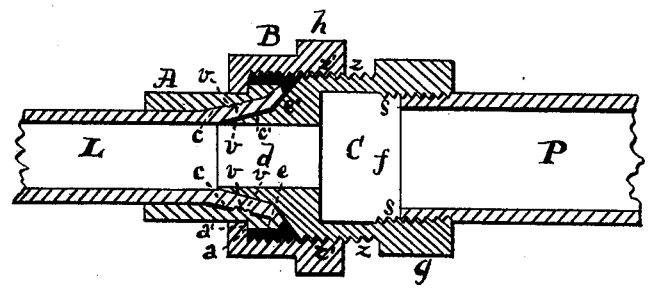
Figure 3:
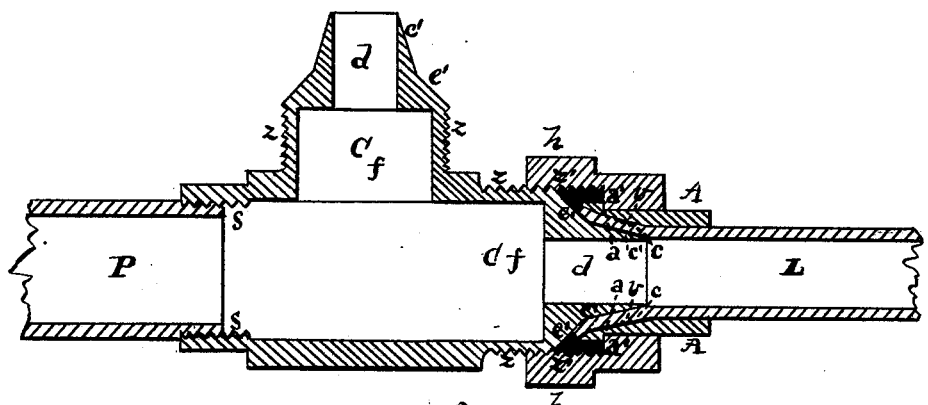

Figure 1 represents a sectional elevation of the several parts of the coupling when disconnected. Fig. 2 is a longitudinal sectional elevation of the parts when the coupling is made to connect the pipes to operate with. Fig. 3 represents the same modified for the connection of a branch pipe.

My invention relates to a coupling for connecting lead pipes with iron pipes; and consists of the combinations of devices hereinafter set forth.

The object of this invention is to connect lead and iron pipes for a continuity of passage of liquids through both, in a water-tight manner, without the employment of wipe-joints heretofore employed.

To enable others skilled in the art to make and use my invention, I will proceed to describe it in reference to the drawings and the letters of reference marked thereon, the same letters indicating similar parts.

In the drawings, A represents a sleeve, provided on its outer surface, at its connecting end, with an annular flange or collar, $a$. The said sleeve is intended to receive the end of the lead pipe L to be connected with the iron pipe, and is made with a diameter of bore at its rear end equal to the outer diameter of the pipe, while the portion of the bore forward is made to gradually enlarge in its diameter by the tapering form $c$, (shown in Fig. 1,) which permits the end of the pipe L to be flared outward, as shown in Figs. 2 and 3. The end of the sleeve forward of the collar $a$ is made with a bevel, $e$, inward, as shown, for receiving the extreme portion of the pipe L, turned from the same so as to form a metal packing when the pipe is properly connected. Made with the tapering portion $c$ of the bore is the series of annular projections or indentations $v$, which are intended to bite on the outer surface of the pipe L when enlarged and flared. C is the screw-connecting sleeve-bush, one end of which is intended to operate with the end of the lead pipe, to swage the same, so as to fill the flaring portion $c$ of the sleeve A and its beveled end $e$, while the opposite end is intended to operate with the iron pipe, P, to be connected. The said sleeve-bush is comprised in one part of the bush $d$, made in its outer diameter with a tapering form, $c'$, to correspond with the flare of the flaring bore $c$ of sleeve A, and with the annular angular sealing-surface $e'$, corresponding with the annular beveled end edge $e$ of the said sleeve, and in the other part by the sleeve $f$, having its inner bore provided with a screw-thread, $s\ s$, to receive an outside screw-thread cut on the iron pipe P, as shown in Fig. 2. The said bush-sleeve is also provided with an outer screw-thread, $z\ z$, and a squared or equivalent thickened annular projection, $g$, which will permit the said piece being grasped and held by a suitable instrument, to prevent the same from turning when the pipe P is being screwed in place within. B is the coupling-collar, made with the ordinary form of construction, and provided with the inner collar $a'$, for engagement with the collar $a$ of the sleeve, and the screw-thread $z'$, to engage with the screw-thread $z$, cut with the bush also. It is also provided with a thickened, squared, or equivalent holding portion, $h$, for engaging with a suitable instrument for operating the said coupling-collar to screw it on or off the bush-sleeve C.

The sleeve A, with its several parts, excepting the annular grooves or teeth $v$ and surface $c'$, and inclined surface $e'$ of the bush end $d$ of the bush-sleeve and the coupling-collar B, belong to a former invention, and are only used by me in combination with the means employed to connect the same with the iron pipe P.

It is readily seen that when the sleeve A is made to inclose the end of the lead pipe L, and the bush $d$ of the bush-sleeve C is forced into the bore of said lead pipe by the screw-collar screwing on the bush-sleeve, the walls of the end of said pipe will be swaged outward to lie closely against the flaring sides $c$ of the bore of the sleeve A and the annular teeth-rings $r$, and also against the bevel $e$, made with the end of the sleeve A, so as to produce a substantial metal packing formed with the extreme end of the pipe L.

It is also readily seen that the iron pipe P being screwed within the sleeve $f$ of the bush-sleeve, while the other parts operate with the lead pipe, produces a secure and water-tight connection of the two pipes, though they are of two different kinds of metal.

Having described my invention, what I claim, and desire to secure by Letters Patent, is—

1. The combination, with the flaring bore $c$ of sleeve A, bush $d$, and screw-coupling B, working on the bush-sleeve C, of the annular teeth or rings $r$, substantially as and for the purpose set forth.

2. The combination, with the sleeve A, having the flaring bore $c$ and beveled end $e$, screw-collar B, provided with collar $a'$, working against collar $a$ of said sleeve, of the bush-sleeve C, provided with the tapering bush $d$, incline $e'$, and screw-thread $z$, working with screw-thread $z'$ of collar A, and the screw-sleeve $f$, whereby a lead pipe may be connected with an iron pipe, substantially as and for the purpose set forth.

HUGH GUYER.

Witnesses:
CHAS. J. SELKIRK,
GEO. A. THOMPSON.